(12) United States Patent
Heller et al.

(10) Patent No.: US 8,502,410 B2
(45) Date of Patent: Aug. 6, 2013

(54) METHOD OF OPERATING A VEHICLE AND ELECTRIC POWERTRAIN

(75) Inventors: Marcus Heller, Farmington Hills, MI (US); Jody J. Nelson, Miami, FL (US)

(73) Assignee: Daimler AG, Suttgart (DE)

( * ) Notice: Subject to any disclaimer, the term of this patent is extended or adjusted under 35 U.S.C. 154(b) by 696 days.

(21) Appl. No.: 12/700,255

(22) Filed: Feb. 4, 2010

(65) Prior Publication Data

US 2011/0186366 A1    Aug. 4, 2011

(51) Int. Cl.
*B60R 16/03* (2006.01)

(52) U.S. Cl.
USPC .......................................... 307/10.1; 180/65.1

(58) Field of Classification Search
USPC .......................................... 307/9.1; 180/65.1
See application file for complete search history.

(56) References Cited

U.S. PATENT DOCUMENTS

| 6,630,810 | B2* | 10/2003 | Takemasa et al. ............ 320/104 |
| 6,664,751 | B1* | 12/2003 | Gabriel et al. ................ 318/599 |
| 6,793,034 | B2  | 9/2004  | Raftari et al. |
| 6,866,350 | B2  | 3/2005  | Palmer et al. |
| 6,909,201 | B2* | 6/2005  | Murty et al. ................. 307/10.1 |
| 7,391,129 | B2  | 6/2008  | Chiao et al. |
| 2006/0046895 | A1 | 3/2006 | Thacher et al. |

FOREIGN PATENT DOCUMENTS

| DE | 10 2005 039 822 A1 | 8/2005 |
| DE | 10 2008 004 300 A1 | 1/2008 |

* cited by examiner

*Primary Examiner* — Rexford Barnie
*Assistant Examiner* — Haihui Zhang
(74) *Attorney, Agent, or Firm* — Crowell & Moring LLP

(57) ABSTRACT

An electric powertrain comprises a high voltage bus an electric machine, and a traction inverter is coupled between a high voltage bus and the electric machine. An electric voltage for the high voltage bus is generated with the electric machine and the traction inverter when the electric machine is driven mechanically. The generated electric voltage is limited and converted to a predetermined voltage lower than the limited voltage. A unit of the vehicle, such as a cooling pump, is powered with the predetermined voltage.

5 Claims, 4 Drawing Sheets

METHOD OF OPERATING A VEHICLE AND ELECTRIC POWERTRAIN

BACKGROUND AND SUMMARY OF THE INVENTION

The present invention relates to a method of operating a vehicle having an electric powertrain that includes a high voltage bus, a traction inverter and an electric machine, with the traction inverter being coupled between the high voltage bus and the electric machine. The method includes generating an electric voltage for the high voltage bus with the electric machine and the traction inverter when the electric machine is driven mechanically. Furthermore, the present invention relates to an electric power train for a vehicle.

It is common for an electric motor to be directly connected to the output through a defined fixed gear ratio in pure electric drive trains. This lowers costs and increases reliability by not having a clutch within the transmission. In many vehicle conditions this approach is sufficient. However, there are conditions in which the lack of a clutch introduces undesired consequences. One such event is during vehicle dinghy tow. When the vehicle is towed, the electric machine increases in speed proportion to the road speed and the gear ratio since the electric machine is directly connected to the output powertrain. In electric machines with permanent magnets (PM) such as Interior Permanent Magnet (IPM) machines, the rotation of the magnets creates a back electromotive force (emf) voltage. The range of the back emf voltage is dependent on the design of the PM machine. This back emf poses a problem for two major reasons:

1) regulations generally require a maximum high voltage (HV) bus voltage of 60 V during an uncontrolled state; and
2) the power electronics have voltage limitations that must be met or permanent damage is possible, while designing the PM machine to limit the back emf too much would prevent the capability of regenerative breaking.

Generally during a tow event, the 12 V system is disabled and thus the power inverters are disabled, preventing an active control method to limit the voltage. Possible solutions would be to apply a continuous 3-phase short. However, temperatures of the power electronics and electric machine quickly reach their limitations without proper cooling that is generally based on the 12 V system. Cooling systems are dependent upon having an active 12 V system or costly HV cooling pumps. Even HV cooling pumps would have difficulties to function properly over the complete voltage range of the back emf of the electric Machine (which could be in a range, for example, of from 60 V to 400 V).

U.S. Pat. No. 6,866,350 describes regenerative breaking in an electric vehicle when towed. The regenerative breaking is actuated to recharge the battery and break the vehicle. When the driver of the towing vehicle depresses the brakes of the vehicle, the electrical vehicle applies regenerative breaking in proportion to a breaking signal from the towing vehicle. This requires an external electrical connector between both vehicles. The issue of providing cooling for the inverters and electric machines is not addressed.

Furthermore, U.S. Pat. No. 6,793,034 discloses a method to disconnect drive wheels from the powertrain of any electrically powered vehicle. A vehicle controller monitors input from, for example, an inertia switch and electric motor generator conditions and can disconnect the output shaft from the drive wheels in a predetermined vehicle condition such as during a rear-end-collision. This requires a mechanical mechanism within the transmission to provide the disconnect, along with a microprocessor to provide the proper disconnect based on defined criteria. Such assembly is similar to having a clutch, which is expensive.

A system and method for powering accessories in a hybrid vehicle are known from U.S. Pat. No. 7,391,129. For this purpose an electric accessory motor is used which is mechanically connected to the combustion motor to provide the mechanical movement. In other words, there is provided an alternator with an ultra-capacitor to supply power when the combustion engine is off during "stop/start" events. However, such system does not work for purely electric vehicles.

Moreover, German patent document DE 10 2008 004 300 A1 discloses a vehicle including a generatively operable electric machine coupled to a wheel, and means for detecting whether the vehicle is towed. During towing the electric machine is operated to supply the on-board network of the vehicle with power. Specifically, a converter is provided to convert a high voltage provided by the electric machine into low voltage.

One object of the present invention is to provide a cost effective solution which allows for towing of an electric vehicle without a clutch.

According to the present invention there is provided a method of operating a vehicle having an electric powertrain, the powertrain comprising a high voltage bus, a traction inverter and an electric machine, wherein the traction inverter is coupled in between the high voltage bus and the electric machine, the method including the steps of:
  generating an electric voltage for the high voltage bus with the electric machine and the traction inverter when the electric machine is driven mechanically;
  limiting the generated electric voltage;
  converting the limited voltage to a predetermined voltage lower than the limited voltage; and
  powering a unit of the vehicle with said predetermined voltage.

Furthermore, there is provided an electric powertrain for a vehicle comprising
  a high voltage bus;
  an electric machine; and
  a traction inverter coupled in between the high voltage bus and the electric machine and adapted for supplying an electric voltage to the high voltage bus when the electric machine is driven mechanically,
wherein
  the traction inverter is adapted to limit the generated electric voltage,
  converting means convert the limited voltage to a predetermined voltage lower than the limited voltage, and
  a unit attached to the electric powertrain is powered with said predetermined voltage.

The advantage of the present invention is that an electric vehicle can be continuously towed at any speed without an expensive and low reliable mechanical clutch inside the transmission. If the electric voltage generated by the electric machine is limited, the current vehicle architecture can be used with only an addition of a small dc/dc converter box. A costly HV cooling pump is not required. The vehicle HV bus can be maintained to a desired programmable limit based on either regulations or component safety.

In a preferred embodiment the generated electric voltage is limited to a maximum lower than 100 V dc. Such a limitation of the generated voltage allows the application of a small, low-cost dc/dc converter.

Preferably the generated electric voltage varies like a sawtooth between two pre-given voltage levels. Such a sawtooth voltage can be easily obtained by the traction inverter when controlled with respect to a maximum level. Specifically, for an electric machine designed as 3-phase motor and for a corresponding traction inverter including six switches (usually realized by a transistor), two for each phase, the limitation of the voltage may be effectively obtained by operating the traction inverter in two states alternatingly: The first state in which all six switches are open so that the electrical machine is disconnected from the high voltage bus, and a second state in which three of the six switches are closed so that the three phases of the motor are shorted. The internal capacity of the HV bus will keep the voltage output from the traction inverter in the generator mode below a certain limit, when the traction inverter is switched between the first state and the second state.

According to a further aspect of the invention, the frequency of the sawtooth may be determined by the discharge rate of the high voltage bus being disconnected from the electric machine. Preferably the frequency of the sawtooth is less than 3 kHz and specifically less than 500 Hz. The discharge may be controlled by a dc/dc converter properly. If the switching frequency of the traction inverter is reduced, for example, from 10 kHz to 300 Hz, the electrical losses of the system may be halved.

In a preferred embodiment the unit attached to the electric powertrain and powered by the converted voltage is a cooling pump for cooling at least the electric machine for the traction inverter. Thus, the electric machine and the traction inverter are not heated excessively during a towing situation.

The lower voltage which is obtained when converting the limited voltage may be a 12 V dc voltage. Thus, although other devices of the low volt bus system of the vehicle can be supplied with sufficient energy when the vehicle is towed.

The above-described electric powertrain is preferably implemented in a motor vehicle like an electric car. However, it also may be implemented in any other electrically driven vehicle in a rail bound system.

Other objects, advantages and novel features of the present invention will become apparent from the following detailed description of the invention when considered in conjunction with the accompanying drawings.

DETAILED DESCRIPTION OF PREFERRED EMBODIMENTS

The present invention aims at providing a cost effective solution allowing for towing over the entire vehicle speed range for an electric powertrain without a clutch. This means that in a specific embodiment the wheels of a car are always connected to the electric machine so that the wheels mechanically drive the electric machine when the vehicle is towed. In this situation the electric machine is used as generator. Thus, electric current is provided by the electric machine and this current can be used for charging a HV battery or to drive other electric components. The generator mode requires that the electric machine and/or the traction inverter coupled between a HV battery and the electric machine are cooled. The energy produced in the generator mode shall be used for driving a cooling pump in a cost-effective way.

The vehicle speed during towing varies so that the back emf of the electric machine can reach 400 V as discussed above. Therefore, the voltage generated has to be converted down with low cost. For this purpose in one embodiment the invention utilizes small existing components within the current electrical vehicle design with the exception of two changes:

(1) introducing a small 100-300 W dc/dc converter to power the 12 V cooling pump for the traction inverter and electric machine; and (2) providing the capability for the traction inverter to apply a 6-switch open and 3-phase short based on HV thresholds without a normal motor control being awake.

Figure 1:
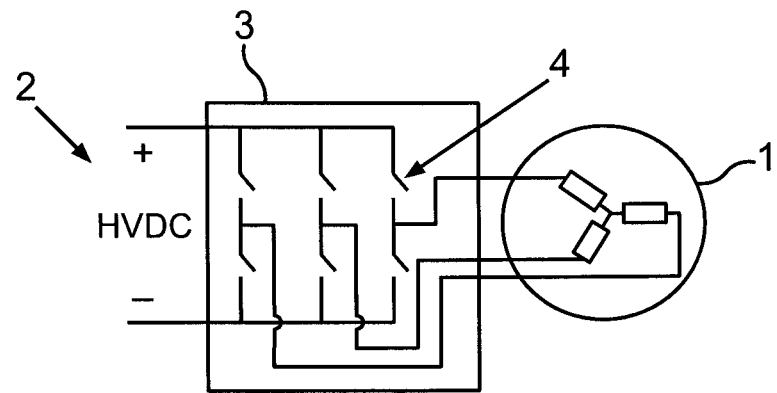
FIG. 1 is a basic diagram of a traction inverter connected to an electric machine in a 6-switch open state.
Figure 2:
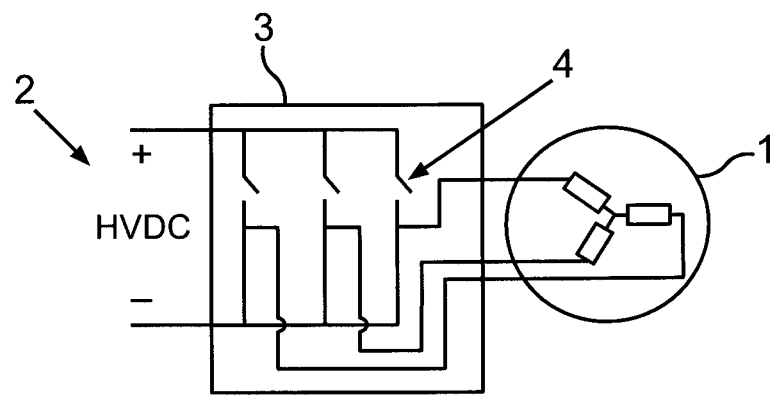
FIG. 2 is a basic diagram of the traction inverter of FIG. 1, in a 3-phase short state.

As to the latter requirement reference is made to FIGS. 1 and 2. FIG. 1 shows an electric machine 1 (symbolized as 3-phase motor) which is powered by HV bus 2 that includes a HV battery (not shown). A HV dc voltage is applied to the HV bus 2. The HV dc voltage is transformed to a 3-phase voltage by a traction inverter 3 coupled between the HV bus 2 and the electric machine 1. The traction inverter 3 has a conventional structure for the motor operation. It includes six switches 4 which typically are realized by transistors and reverse recovery diodes. Each phase of the electric machine 1 is connected by two switches 4 in a half bridge manner to the HV bus 2. (Reverse recovery diodes parallel to each transistor are not shown in FIG. 1 for simplicity.) FIG. 1 shows a state of the traction inverter 3 where the six switches 4 are open so that the electric machine 1 is coupled to the HV bus via the reverse recovery diodes.

FIG. 2 shows the traction inverter 3 in a 3-phase short state. I.e., three of the six switches are closed, so that the three phases of the electric machine are shorted.

The application of a 6-switch open and a 3-phase short to the traction inverter 3 can be accomplished by an FPGA (Field Programmable Gate Array) or similar device that would be programmed to apply a 3-phase short when the HV bus reaches 60 V and would apply a 6-switch open when the HV bus 2 reaches 40 V, for instance. Applying a 3-phase short removes the back emf voltage of the electric motor 1 from the HV bus 2 and the HV voltage will begin to reduce. Applying a 6-switch open again applies the back emf voltage to the HV bus through the reverse recovery diodes. This will create a continuous sawtooth like wave form bounded between 40 and 60 V. The average dc voltage would be approximately 50 V.

The invention is independent on the 12 V bus of a typical vehicle. Besides dinghy towing, another reason for towing could be loss of the 12 V battery (dead battery). In this case, the proposed invention still functions properly.

Figure 3:
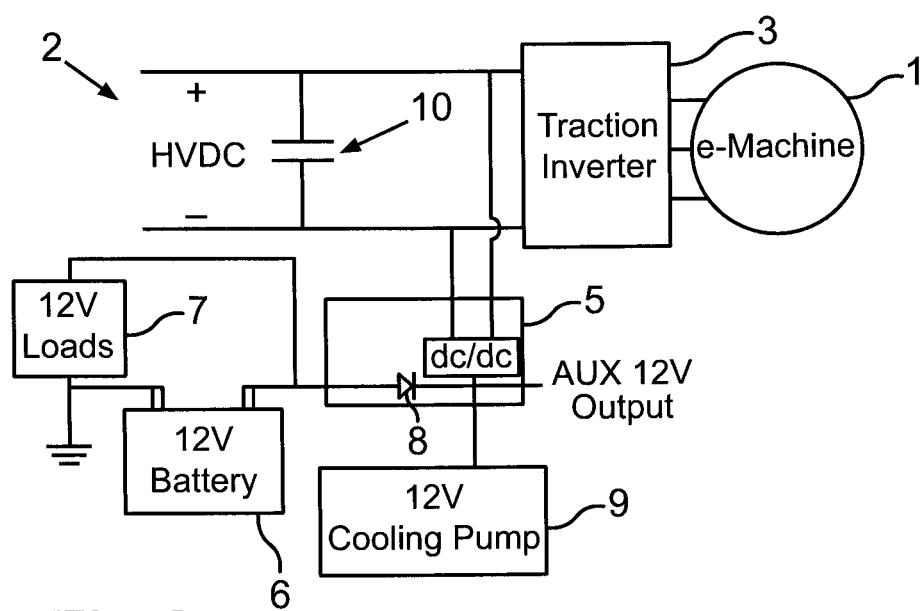
FIG. 3 is a basic diagram of the inventive circuitry for an electric powertrain without a clutch.

The voltage generated by the electric machine 1 is limited by the specific controlling of the traction inverter 3. Such limitation allows the use of a comparatively small dc/dc converter for powering a 12V cooling pump, for instance. Such structure of an electric powertrain including a cooling pump is shown in FIG. 3. A dc/dc converter box 5 has three inputs and two outputs. Optionally it can also have an enable or disable input to turn on or off the dc/dc converter box 5 when needed or not needed, respectively. The dc/dc converter box 5 is directly connected to the HV bus 2 with its own protection over the complete HV bus voltage range. The dc/dc converter box senses the HV bus and becomes active in the voltage range from 40 V to 60 V producing a constant 12 V or similar voltage. The dc/dc converter box 5 has an input from a 12 V battery and prevents current from going back to the 12 V battery and all low voltage loads 7 by a diode 8, for example. The dc/dc converter box 5 outputs directly to a 12 V cooling pump 9 for the power electronics (traction inverter 3) and electric machine 1. The dc/dc converter box 5 could also have an external 12 V auxiliary voltage output for other low power consuming components, such as control boards for other critical components.

Figure 4:
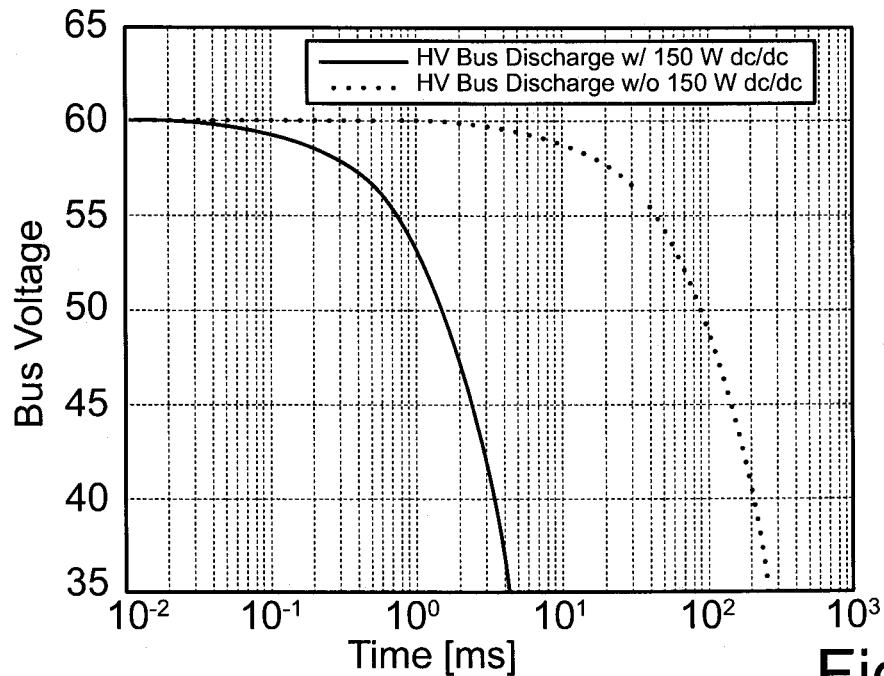
FIG. 4 illustrates a bulk capacitor discharge simulation with and without 150 W dc/dc converter.
Figure 5:
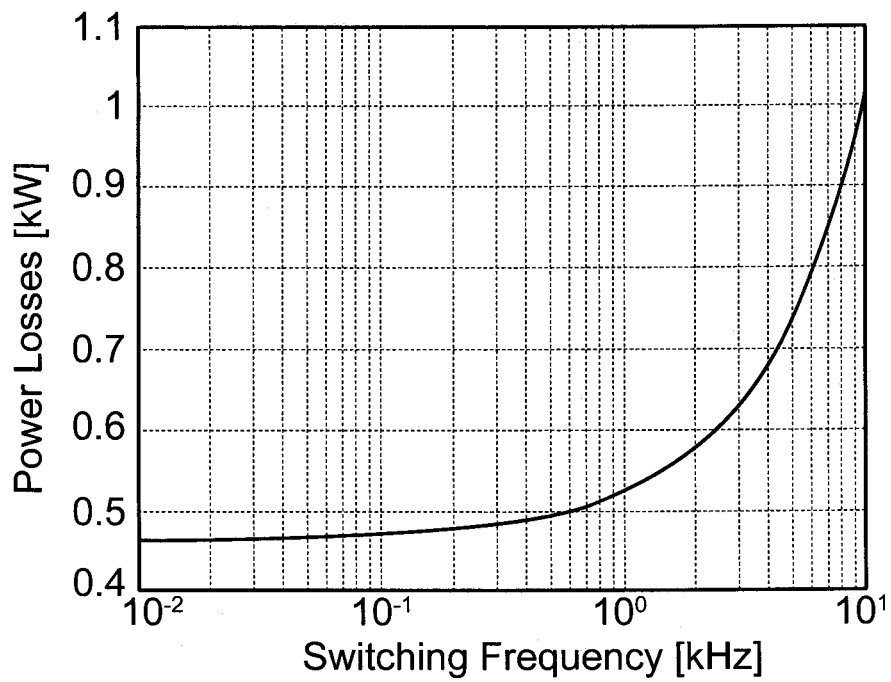
FIG. 5 shows total IGBT/diode losses based on switching frequency.

In an exemplary embodiment a high voltage bus 2 with a total of 0.5 mF bulk capacitance is assumed with a bleed resistor. The dc/dc converter 5 is assumed at full load of 150 W. The voltage fluctuates from 60 V down to 40 V and is dependent upon discharge of the bulk capacitance 10 (compare FIG. 3) and its loads. It has been simulated that this discharge occurs within 3.3 ms, as shown in FIG. 4. If the dc/dc converter box 5 is not connected to the HV bus 2, a discharge would last about 200 ms. The discharge time of 3.3 ms corresponds to a switching frequency of 300 Hz. Using IGBT (Insulated Gate Bipolar Transistor) manufacturer's loss calculations, it is seen that the IGBT/diode losses are reduced by 52% when the switching frequency in this condition is changed from 10 kHz (normal switching frequency of the traction inverter 3) to 300 Hz. As shown in FIG. 5 total losses at 10 kHz are slightly greater than 1 kW and drop to 480 W at 300 Hz. This reduction in losses ensures that the proposed invention works since the inverters and cooling system are designed assuming the higher switching frequency and higher losses. Thus, continuous dinghy tow at any speed is possible by the invention.

Figure 6:
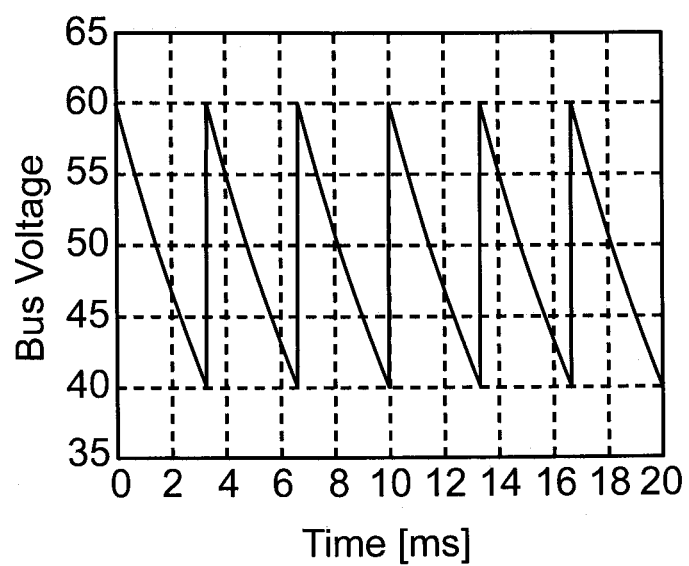
FIG. 6 illustrates HV bus voltage obtained with the circuitry of FIGS. 1 and 2.

FIG. 6 illustrates a simulation of the HV bus voltage when using the invention. At 60 V the traction inverter 3 is switched to the 3-phase short state, so that the HV bus 2 discharges. When the HV bus voltage reaches 40 V, the traction inverter 3 is switched to the 6-switch open state so that the HV bus voltage rises to 60 V again. Such kind of controlling of the traction inverter leads to a limited HV bus voltage, here 50 V in average.

A typical 12 V cooling pump requires 80-100 W of power. If desired, an optional auxiliary 12 V output could be provided to power other critical low voltage devices such as a micro processor or controller. A typical controller requires less than 150 W of power. An off-the-shelf 150 W dc/dc converter has the dimensions of 11.7×6.4×7.2 cm, for example, and requires an input voltage from 36 V to 72 V. If the auxiliary voltage is not required the design can be smaller.

One major advantage of the above-described powertrain including a cooling pump is that it provides a cost effective solution to cool the inverter during towing, allowing for the voltage to be controlled to a defined limit and not requiring a clutch. The invention can be universally used on any electric vehicle, hybrid electric vehicle, fuel cell vehicle, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS 1 electric machine
2 high voltage bus
3 electric traction converter
4 switches
5 dc/dc converter
6 12 V battery
7 low voltage loads
8 diode
9 cooling pump
10 bulk capacitance

What is claimed is:

1. A method of operating a vehicle having an electric powertrain comprising a high voltage bus, an electric machine, and a traction inverter coupled between the high voltage bus and the electric machine, the method comprising:
said electric machine and the traction inverter generating an electric voltage for the high voltage bus when the electric machine is driven mechanically;
limiting the generated electric voltage;
converting the limited voltage to a predetermined voltage lower than the limited voltage; and
powering a unit of the vehicle with said predetermined voltage;
wherein the generated electric voltage varies, according to a sawtooth pattern, between two pre-given voltage levels.

2. The method according to claim 1, wherein the generated electric voltage is limited to a maximum lower than 100 V.

3. The method according to claim 1, wherein a frequency of the generated electric voltage is determined by a discharge rate of the high voltage bus being disconnected from the electric machine.

4. The method according to claim 3, wherein the frequency of the generated electric voltage is less than 3 kHz.

5. The method according to claim 3, wherein the frequency of the generated electric voltage is less than 500 Hz.

* * * * *